(No Model.)
F. R. MINER.
LEMON SQUEEZER.
No. 576,138. Patented Feb. 2, 1897.
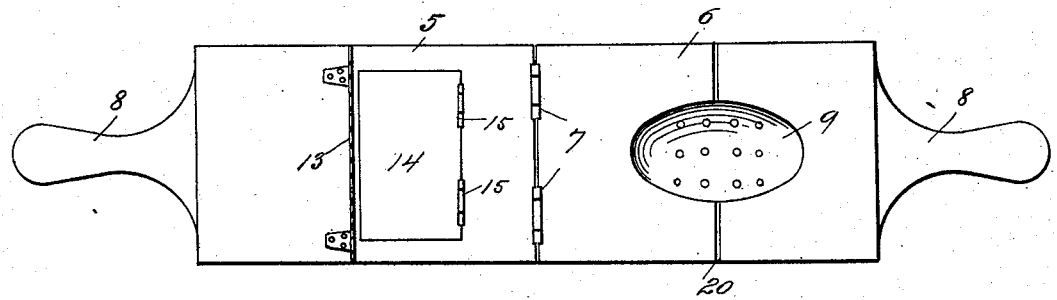
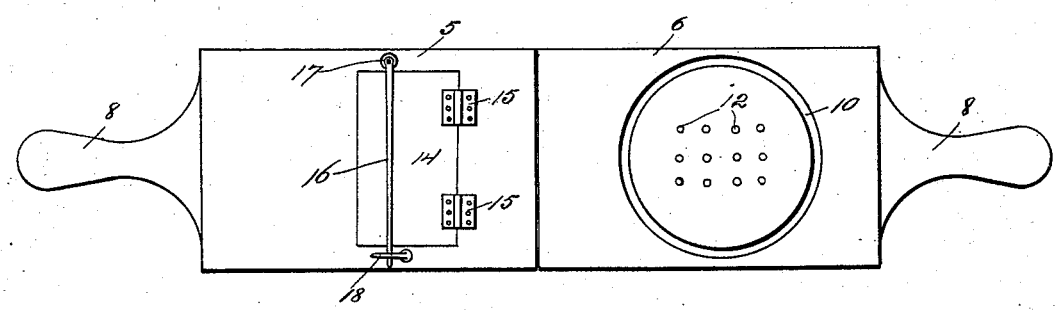
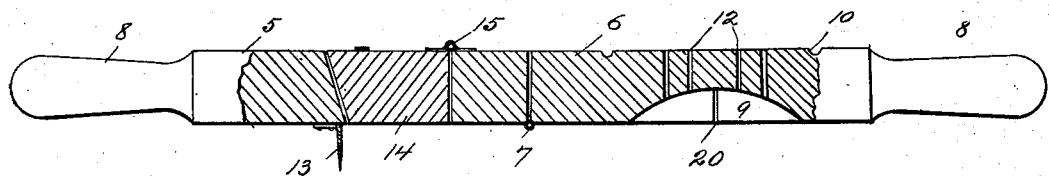
WITNESSES
INVENTOR
Frederick R. Miner
BY
Edgar Tate & Co.
ATTORNEYS

UNITED STATES PATENT OFFICE.

FREDERICK ROLAND MINER, OF LOS ANGELES, CALIFORNIA.

LEMON-SQUEEZER.

SPECIFICATION forming part of Letters Patent No. 576,138, dated February 2, 1897.

Application filed July 16, 1896. Serial No. 599,419. (No model.)

*To all whom it may concern:*

Be it known that I, FREDERICK ROLAND MINER, a citizen of the United States, and a resident of Los Angeles, in the county of Los Angeles and State of California, have invented certain new and useful Improvements in Devices for Extracting the Juice of Lemons and other Fruits, of which the following is a specification, reference being had to the accompanying drawings, forming a part thereof, in which similar numerals of reference indicate corresponding parts wherever found throughout the several views.

This invention relates to devices for extracting the juice of lemons and other fruits; and the object of the invention is to provide an improved device of this class which is simple in construction and operation and comparatively inexpensive.

The invention is fully disclosed in the following specification, of which the accompanying drawings form a part, in which—

Figure 1 is a top plan view of my improved lemon-juice extractor; Fig. 2, a bottom plan view thereof, and Fig. 3 a sectional side view.

In the practice of my invention I provide a lemon-juice extractor which consists of two similar blocks 5 and 6, which are preferably composed of wood and which are hinged together at 7, and each of which is provided at its outer or free end with a handle 8. The blocks 5 and 6 are oblong in form, and formed in one side of one of them is a circular or elliptical cavity or recess 9, which is adapted to receive a lemon or a part of a lemon, and on the opposite side of said block is an annular groove 10, which is adapted to receive the rim of a goblet, tumbler, or other vessel which is used in practice as a receptacle for the extracted juices, and the bottom of the cavity or recess 9 is provided with a plurality of transverse openings, bores, or passages 12, through which the extracted juices pass into said goblet or receptacle.

The cavity or receptacle 9 is formed on what I have called the "top" or "upper" surface of one part of the extractor, and arranged transversely of the opposite part and on the same side is a knife or blade 13, which is secured thereto in any desired manner and which is designed, as hereinafter described, to cut the lemon, and in front of said blade is a hinged door 14, said door being hinged at 15 and adapted to open upwardly when the separate parts of the lemon-juice extractor are pressed together, and arranged transversely of the back of said door is a bar 16, which is pivoted at 17 and which is adapted to hold the door in place when in a closed position, the free end thereof in this operation engaging with a hook or catch 18.

By means of this device the juice may be extracted from the lemon without peeling or otherwise cutting the lemon before it is placed in the extractor, and by this means I provide for the extracting of the juice thereof without soiling the hands or gumming them with said juice of the lemon, and in this operation all that is necessary is to place a lemon in the cavity or recess 9 and then bring the opposite side of the extractor over so that it will press thereon, and in this operation the knife or blade 13 enters a transverse slot 20, formed in the part 6 of the extractor and which crosses the cavity or receptacle 9, which operation divides the lemon, as will be readily understood, and then by firmly pressing the separate parts of the extractor together by means of the handles 8 the juice will be compressed therefrom and pass through the passages or openings 12 into the goblet or other vessel which is prepared therefor.

It sometimes happens that it is only necessary or desired to extract the juice of a part of a lemon, and when this is the case the bar 16 is disconnected from the hook or catch 18, and when the separate parts of the extractor are brought together, as hereinbefore described, the blade 13 divides the lemon and a part thereof passes through the door or the opening formed thereby, and only a portion or one-half of the lemon will have the juice extracted therefrom, but whenever it is desired to extract the juice from the entire lemon the door is left in the locked position, as will be readily understood.

The circular groove 10 is not essential, as the extractor may be used over any sort of a receptacle, but when said groove is employed it serves to retain the extractor on the goblet or receptacle, and pressure may be applied to the extractor in any desired manner, either by pressing on the upper portion thereof or by pressing the handles 8 together.

This device is simple in construction and operation and well adapted to accomplish the result for which it is intended, and it may be made of any desired material.

Having fully described my invention, I claim as new and desire to secure by Letters Patent—

A lemon-juice extractor of the character described, consisting of two interhinged blocks, the free ends of which are provided with handles, one of said blocks having a depression formed therein with which communicate transverse openings, the opposite side of the block above said depressions being provided with an annular groove to receive the rim of the receiving vessel, the other block having secured thereon a knife-blade adapted to enter a groove in the sides of the depressions when the blocks are folded, the last-mentioned block being provided on the side opposite the knife-blade with a hinged door, and a bar pivoted at one side of the door and adapted to swing over the same and engage a catch on the opposite side, to retain the door in a closed position and to swing outwardly permitting the door to open and allow the passage of part of the lemon therethrough as shown and described.

In testimony that I claim the foregoing as my invention I have signed my name, in presence of the subscribing witnesses, this 7th day of July, 1896.

FREDERICK ROLAND MINER.

Witnesses:
HENRY A. DARLING,
GEORGE E. PRATT.